United States Patent
Cho et al.

(10) Patent No.: US 7,926,965 B2
(45) Date of Patent: Apr. 19, 2011

(54) LAMP SOCKET, BACKLIGHT ASSEMBLY AND DISPLAY DEVICE HAVING THE SAME

(75) Inventors: Joo-Woan Cho, Asan-si (KR); Seong-Sik Choi, Seoul (KR); Yong-Woo Lee, Suwon-si (KR); Hyun-Chul Bae, Cheonan-si (KR); Du-Hwan Chung, Suwon-si (KR); Cheol-Yong Noh, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 229 days.

(21) Appl. No.: 12/137,033

(22) Filed: Jun. 11, 2008

(65) Prior Publication Data

US 2009/0128734 A1    May 21, 2009

(30) Foreign Application Priority Data

Nov. 21, 2007   (KR) .................. 10-2007-0119299

(51) Int. Cl.
*H01R 33/08* (2006.01)
(52) U.S. Cl. ............ 362/97.1; 362/97.2; 362/97.4; 362/630; 362/613; 439/232; 439/239; 439/242
(58) Field of Classification Search ............ 439/232, 439/239, 242; 362/97.1, 97.2, 97.4, 630, 362/611, 613, 614, 330; 349/61–71
See application file for complete search history.

(56) References Cited

U.S. PATENT DOCUMENTS

| 4,863,394 | A * | 9/1989 | Henshaw, Jr. | 439/239 |
| 7,633,578 | B2 * | 12/2009 | Park et al. | 349/70 |
| 7,674,006 | B2 * | 3/2010 | Lee | 362/225 |

FOREIGN PATENT DOCUMENTS

KR    10-2007-0081261    8/2007

* cited by examiner

*Primary Examiner* — Anabel M Ton
(74) *Attorney, Agent, or Firm* — Cantor Colburn LLP

(57) ABSTRACT

A lamp socket that can reduce the thickness of both sides of a display device includes a socket main body having a contact hole formed therein, and a power-applying member coupled to the socket main body through the contact hole, and provided with a lamp connection terminal, an inverter connection terminal, and a terminal connection part connected with the lamp connection terminal in a bent form so as to connect the lamp connection terminal with the inverter connection terminal. Accordingly, the thickness of both sides of the display device including the lamp sockets is reduced, and the compatibility of the product is extended.

21 Claims, 9 Drawing Sheets

LAMP SOCKET, BACKLIGHT ASSEMBLY AND DISPLAY DEVICE HAVING THE SAME

This application claims priority to Korean Patent Application No. 10-2007-0119299, filed on Nov. 21, 2007, and all the benefits accruing therefrom under 35 U.S.C. §119, the contents of which in its entirety are herein incorporated by reference.

BACKGROUND OF THE INVENTION

1. Field of the Invention

The present invention relates to a lamp socket, a backlight assembly and a display device having the same. More particularly, the present invention relates to a lamp socket that can reduce the number of constituent elements and the thickness of both sides of a display panel, and a backlight assembly and a display device having the same.

2. Description of the Prior Art

Generally, a backlight assembly adopted in a liquid crystal display ("LCD") is classified into a direct downward type backlight assembly and an edge type backlight assembly in accordance with the arrangement of a light source.

A representative light source for use in a backlight assembly is a cold cathode fluorescent lamp ("CCFL"). A direct downward type backlight assembly adopting CCFLs may include lamp sockets for fixing the lamps to a bottom plate of a receptacle. In order to facilitate assembling of a plurality of lamps, a backlight assembly having lamp sockets into which electrode parts of the lamps are inserted has been developed.

A conventional lamp socket necessarily has a specified thickness, and thus the thickness of both sides of a display panel is increased.

Also, in assembling a backlight assembly, a plurality lamp sockets and inverters are soldered through wires, or terminals of a plurality of lamp sockets and inverters are soldered.

BRIEF SUMMARY OF THE INVENTION

It has been determined herein, according to the present invention, that the increased thickness of the panel due to the conventional lamp socket is an obstacle to diverse shapes of a display device, and causes low compatibility and inferior external appearance of the display device.

It has also been determined herein, according to the present invention, that due to the conventional assembly of a backlight assembly, it requires significant time to assemble the backlight assembly, and lamp damage frequently occurs in the soldering process. Also in the conventional assembly, in case of replacing an inferior inverter, all the lamps should be separated from the lamp sockets prior to the replacement of the inverter, and this decreases work efficiency.

The present invention provides a lamp socket that can reduce the thickness of both sides of a display panel.

The present invention also provides a backlight assembly that includes the lamp sockets and reduces the thickness of both sides of a display panel.

The present invention also provides a display device that includes the lamp sockets.

According to exemplary embodiments of the present invention, a lamp socket includes a socket main body having a contact hole formed therein, and a power-applying member coupled to the socket main body through the contact hole, and provided with a lamp connection terminal, an inverter connection terminal, and a terminal connection part connected to the lamp connection terminal in a bent form so as to connect the lamp connection terminal with the inverter connection terminal.

According to other exemplary embodiments of the present invention, a backlight assembly includes a receptacle having a bottom plate on which openings are formed and side walls arranged around the bottom plate, a plurality of lamps having lamp main bodies and electrode parts formed at edges of the lamp main bodies, respectively, and arranged on the bottom plate, a plurality of lamp sockets each including a socket main body having a contact hole formed therein, and a power-applying member coupled to the socket main body through the contact hole and provided with a lamp connection terminal, an inverter connection terminal, and a terminal connection part connected to the lamp connection terminal in a bent form so as to connect the lamp connection terminal with the inverter connection terminal, and a power supply board arranged on a rear surface of the bottom plate and outputting a lamp-driving voltage to the power-applying member.

According to still other exemplary embodiments of the present invention, a display device includes a receptacle having a bottom plate on which openings are formed and side walls, a plurality of lamps having lamp main bodies and electrode parts formed at edges of the lamp main bodies, respectively, and arranged on the bottom plate, a plurality of lamp sockets each including a socket main body having a contact hole formed therein, and a power-applying member coupled to the socket main body through the contact hole and provided with a lamp connection terminal, an inverter connection terminal, and a terminal connection part connected with the lamp connection terminal in a bent form so as to connect the lamp connection terminal with the inverter connection terminal, a power supply board having one side edge inserted into an inverter insertion hole and applying a lamp driving voltage to the inverter connection terminal, a side cover covering the socket main bodies, optical sheets supported by the side cover, and a display panel arranged on the optical sheets.

BRIEF DESCRIPTION OF THE DRAWINGS

The above and other features and advantages of the present invention will be apparent from the following detailed description taken in conjunction with the accompanying drawings, in which.

DETAILED DESCRIPTION OF THE INVENTION

Figure 1:
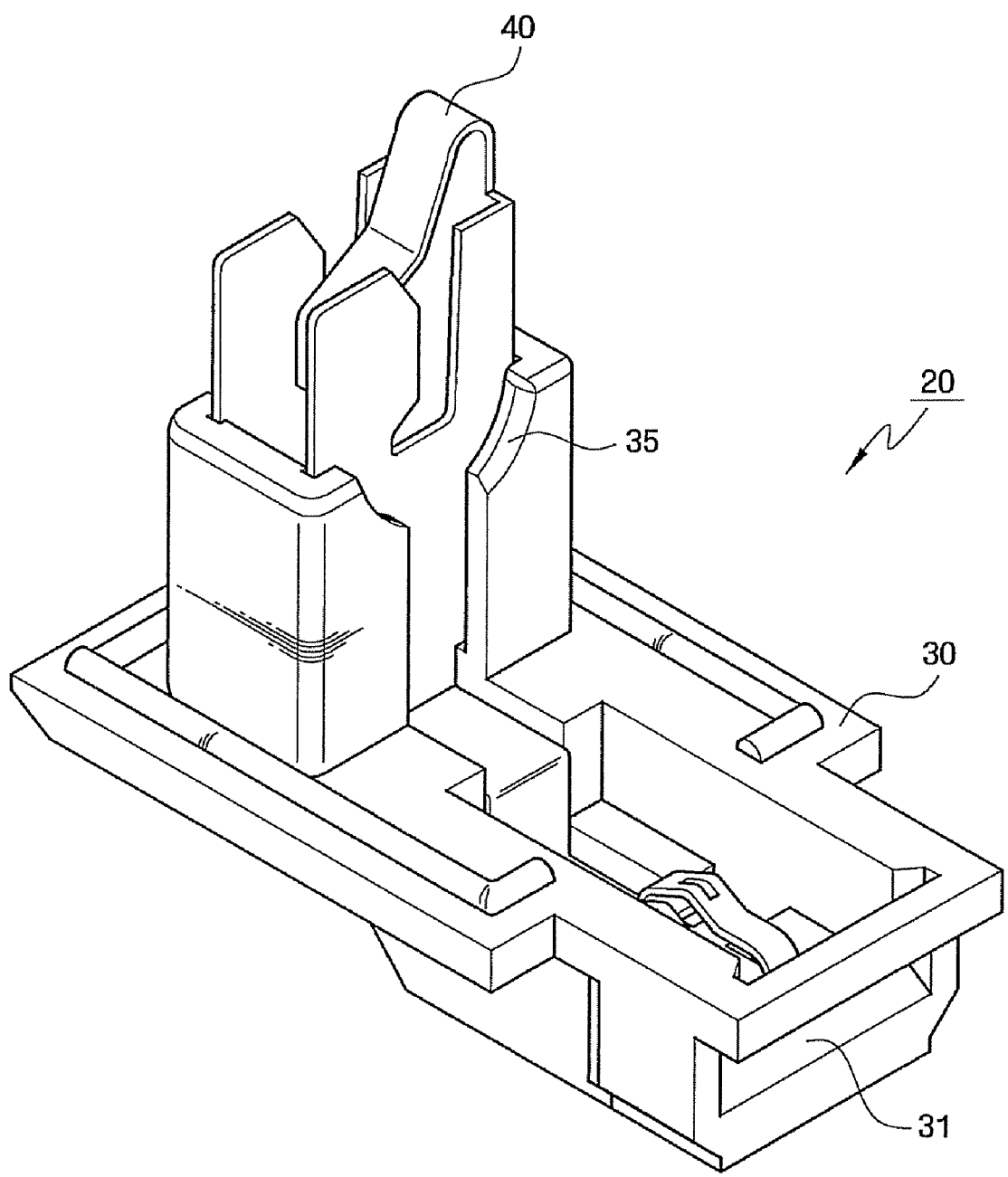
FIG. 1 is a perspective view of an exemplary lamp socket according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Lamp Socket

Figure 2:
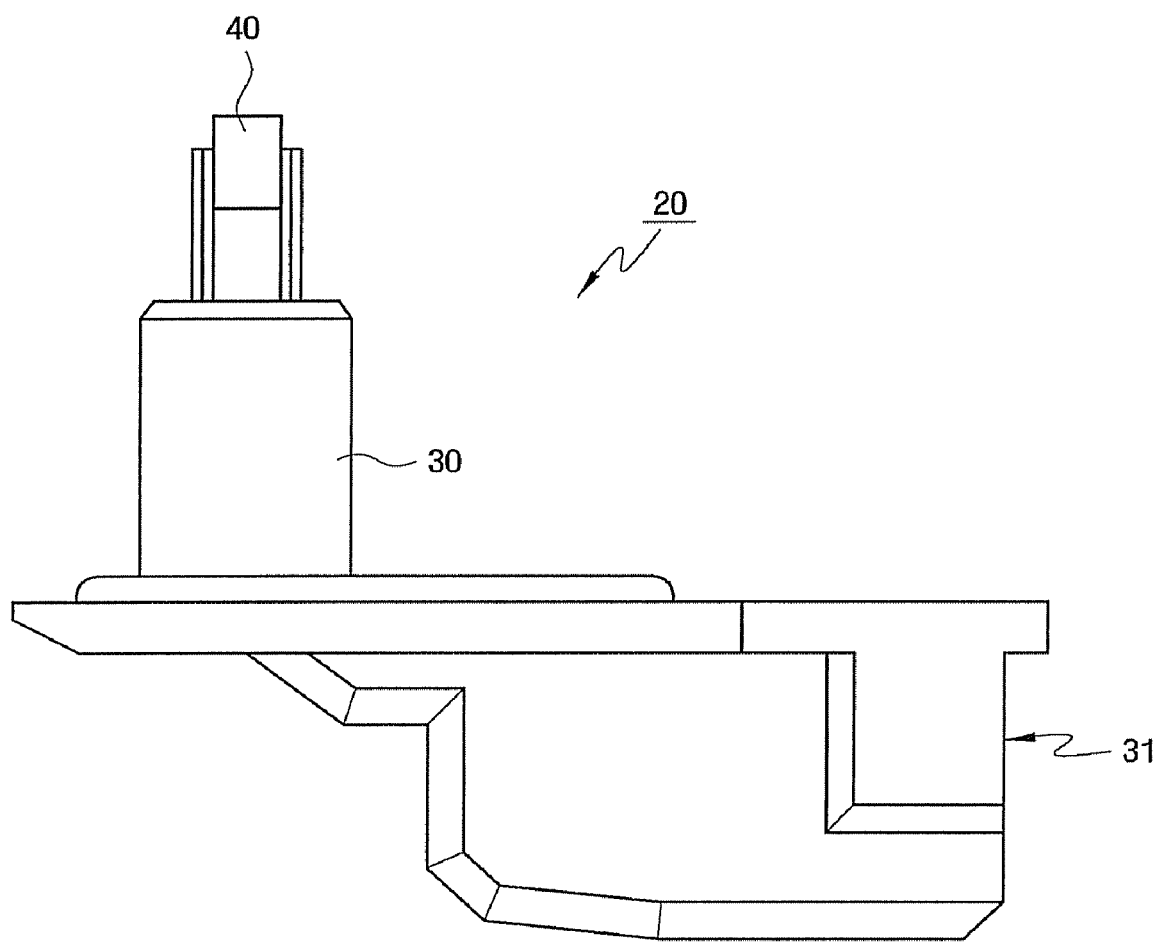
FIG. 2 is a side view of the exemplary lamp socket illustrated in FIG. 1.
Figure 3:
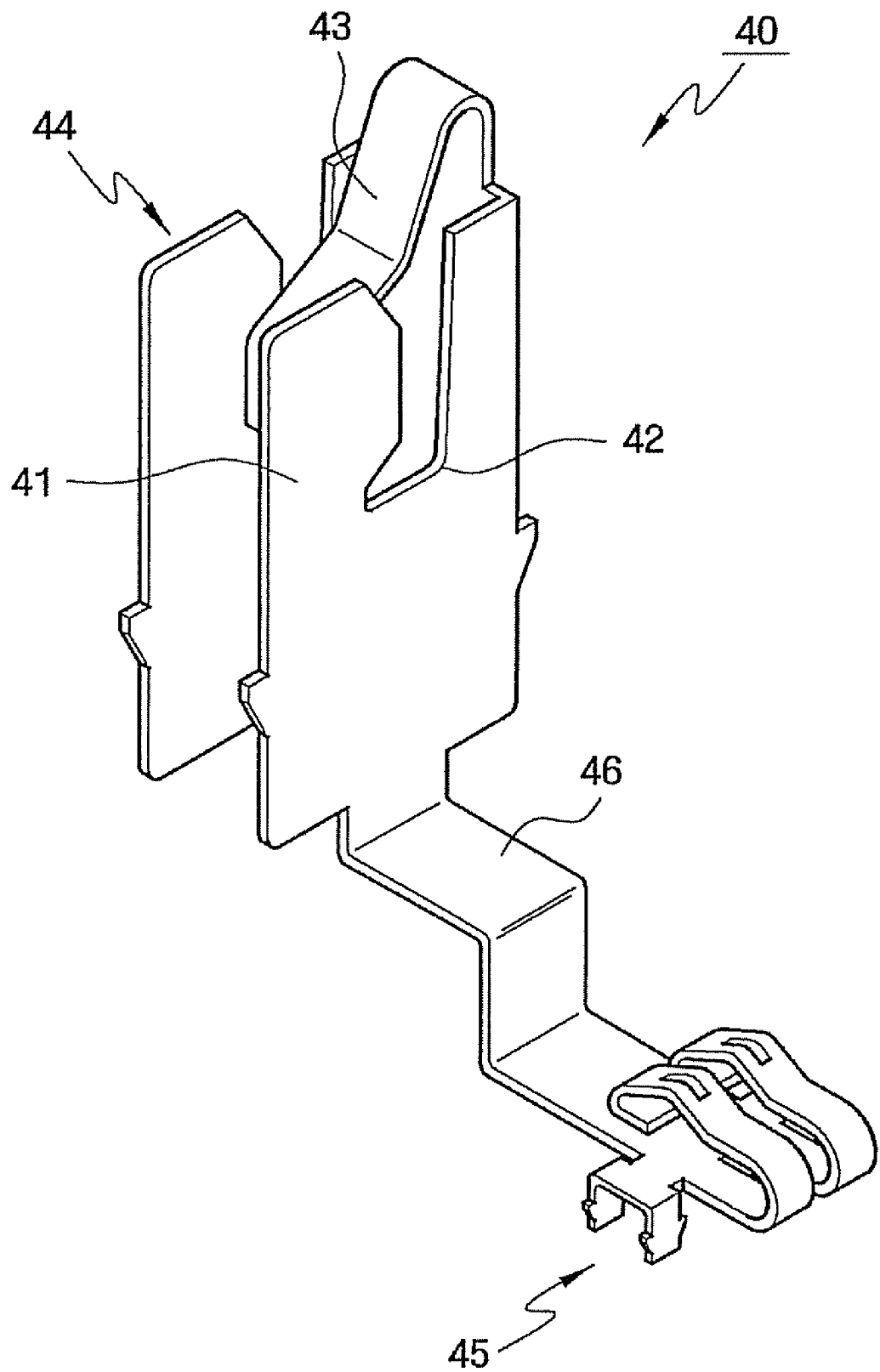
FIG. 3 is a perspective view of the exemplary power-applying member illustrated in FIGS. 1 and 2.

FIG. 1 is a perspective view of an exemplary lamp socket according to an exemplary embodiment of the present invention, and FIG. 2 is a side view of the exemplary lamp socket illustrated in FIG. 1. FIG. 3 is a perspective view of the exemplary power-applying member illustrated in FIGS. 1 and 2.

Referring to FIGS. 1 to 3, a lamp socket 20 includes a socket main body 30 and a power-applying member 40. The lamp socket 20 fixes lamps, for providing rear light in a display device, to a receptacle, and applies a lamp driving voltage to the lamps.

The socket main body 30 is a three-dimensional molded product, and a contact hole 35 is formed on an upper part of the socket main body 30. On a lower part of the socket main body 30, an inverter insertion hole 31 that is connected to the contact hole 35 is formed. Specifically, the inverter insertion hole 31 is formed on the lower part of the socket main body 30, and the contact hole 35 is open toward an upper surface of the socket main body 30. In an exemplary embodiment, the contact hole 35 may extend in a different direction than a direction in which the inverter insertion hole 31 extends. For example, the contact hole 35 may extend in a direction that is substantially perpendicular to an extending direction of the inverter insertion hole 31.

The power-applying member 40 is coupled to the socket main body 30 through the contact hole 35. The power-applying member 40 is made of conductive metal, and electrically connects electrode parts of the inverter and the lamp with each other. The power-applying member 40 includes a lamp connection terminal 44, an inverter connection terminal 45, and a terminal connection part 46 connecting the lamp connection terminal 44 with the inverter connection terminal 45. The terminal connection part 46, the lamp connection terminal 44, and the inverter connection terminal 45 may be formed in a body. In other words, the terminal connection part 46, the lamp connection terminal 44, and the inverter connection terminal 45 may be integrally formed in a unitary piece. The terminal connection part 46 has at least one bent part, and thus may be connected to the lamp connection terminal 44 and the inverter connection terminal 45 in a bent form. For example, the terminal connection part 46 may be composed of at least one horizontal portion and at least one vertical portion. As the terminal connection part 46 has the horizontal portion, the lamp connection terminal 44 is not required to be arranged on the same vertical line as the inverter connection terminal 45. Accordingly, if the lamp connection terminal 44 is arranged on a side part of the display device, the inverter connection terminal 45 can be relatively arranged on a center part of the display device, and thus the thickness of both side parts of the display device can be reduced. Thus, the compatibility of the display device can be increased, and the display device can be slimmed. The terminal connection part 46 may have diverse shapes, and may be provided with two or more bent parts to connect the lamp connection terminal 44 with the inverter connection terminal 45. In addition, the terminal connection part 46 may be in the form of steps. The lamp connection terminal 44 is exposed to the outside through the contact hole 35, and the inverter connection terminal 45 is exposed to an outside through the inverter insertion hole 31. The lamp connection terminal 44 may extend generally in the direction that the contact hole 35 extends and the inverter connection terminal 45 may extend generally in the direction that the inverter insertion hole 31 extends, and the terminal connection part 46 has the above-described configuration such that a connection between the lamp connection terminal 44 and the inverter connection terminal 45 extending in different directions is made possible.

The lamp connection terminal 44 may include a first plate 41, a first guide groove 42, and a plate spring 43. Specifically, in an exemplary embodiment, two first plates 41 are arranged side by side, and each side part of the pair of the first plates 41 is connected. Two first plates 41 may be arranged substantially parallel to each other and spaced apart by a distance, which may be equivalent to a width of a side connecting strip connecting the side parts or edges of the two first plates 41 together. The first guide groove 42, into which the lamp is inserted, is formed on at least the first plate 41 positioned closer to the lamp, although the first guide groove 42 may be formed on both the first plates 41. The plate spring 43 is arranged on one side of the first plate 41 that pressingly fixes the lamp inserted into the first guide groove 42. The plate spring 43 may be formed in a body with connection parts of the pair of first plates 41. In an exemplary embodiment, the width of the side connecting strip may be at least as great or greater than a width of the plate spring 43, and the plate spring 43 may extend upwardly from a top portion of the side connecting strip and may then be bent downwardly so as to be positioned between the first plates 41. The plate spring 43 may then be disposed at an angle such that it is positioned adjacent to the first guide groove 42. As described above, the lamp socket 20 according to an embodiment of the present invention has a structure from which a socket cover can be excluded, and the lamp can be fixed to the lamp connection terminal 44 of the power-applying member 40 using the first guide groove 42 and the plate spring 43.

According to the principle to fix the lamp to the lamp connection terminal 44 of the power-applying member 40, the electrode of the lamp is introduced between the plate spring 43 and the first guide groove 42 by an external force. In this case, the plate spring 43 may include a recessed surface to facilitate the introduction of the electrode of the lamp. The first guide groove 42 may include a slot that extends in the extending direction of the contact hole 35, and may include an indentation extending from the bottom of the slot, in a different direction from the extending direction, to receive the electrode of the lamp therein. The electrode may be retained within the indentation of the first guide groove 42 by the recessed surface of the plate spring 43. By simply pressing the lamp, the lamp is easily introduced and fixed to the power-applying member 40, resulting in convenient assembling of the lamp.

In an exemplary embodiment, a connection portion may depend from the inverter connection terminal 45 such that the connection portion may secure the power applying member 40 to the socket main body 30. The connection portion may include prongs as shown in FIG. 3 which may be inserted within an opening in the socket main body 30.

The lamp socket 20 according to an exemplary embodiment of the present invention may further include a socket cover (not illustrated). In this case, a lead wire of the lamp is fixed to the lamp socket 20 in a manner that the power-applying member 40 is inserted into a hole formed on the socket main body 30, the lead wire of the lamp is fitted into the terminal of the power-applying member 40, and then the socket cover is inserted into the socket main body 30.

Power-Applying Module

Figure 4:
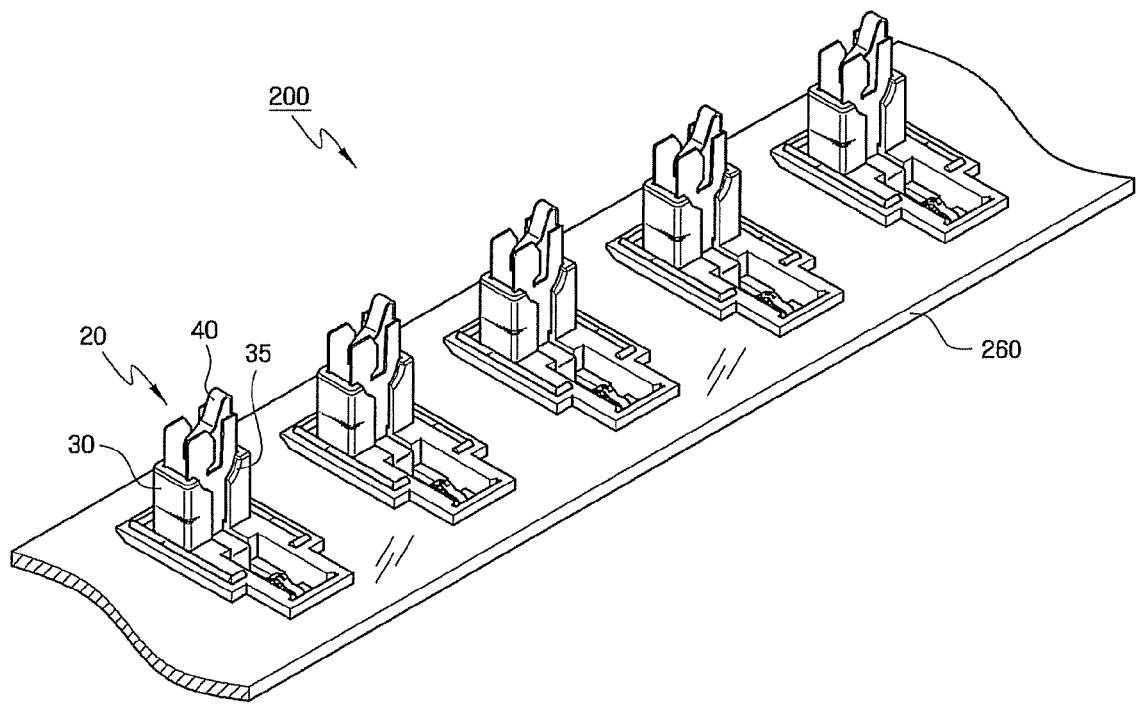
FIG. 4 is a perspective view of an exemplary power-applying module according to an exemplary embodiment of the present invention.
Figure 5:
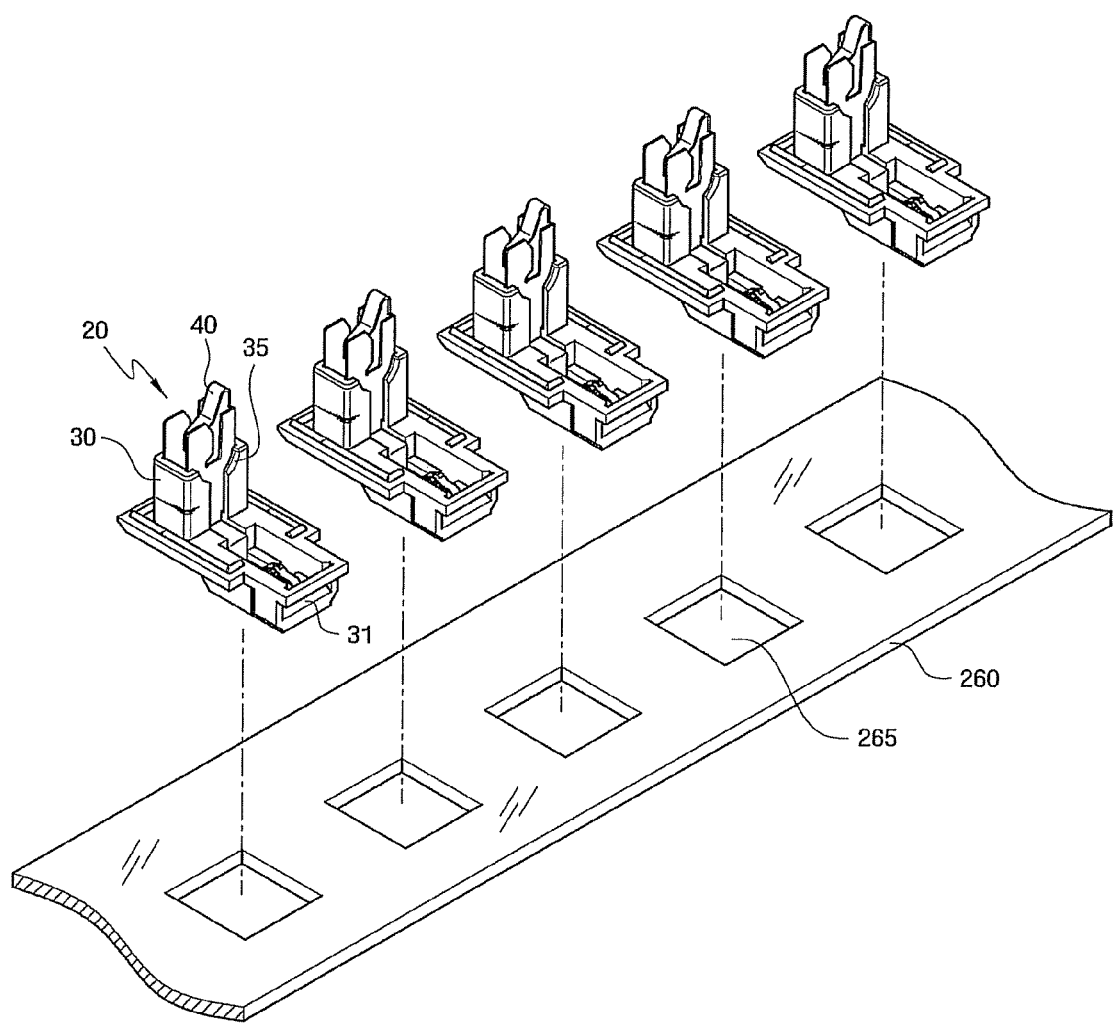
FIG. 5 is an exploded perspective view of the exemplary power-applying module illustrated in FIG. 4.

FIG. 4 is a perspective view of an exemplary power-applying module according to an exemplary embodiment of the present invention, and FIG. 5 is an exploded perspective view of the exemplary power-applying module illustrated in FIG. 4.

Referring to FIGS. 4 and 5, a power-applying module 200 includes a plurality of lamp sockets 20 that can be coupled to a plurality of lamps, and a connection plate 260 onto which the plurality of lamp sockets 20 are inserted and arranged.

The connection plate 260 is in the form of a plate elongated in one direction. In an exemplary embodiment, the connection plate 260 may be extended in a direction that is substantially perpendicular to an extending direction of the contact hole 35 and substantially perpendicular to an extending direction of the inverter insertion hole 31. On the connection plate 260, a plurality of socket fixing parts 265 are formed at predetermined intervals. That is, the socket fixing parts 265 may be substantially evenly spaced apart from each other. The socket fixing part 265 may be an opening formed on the connection plate 260.

The lamp socket 20 composed of the power-applying member 40 and the socket main body 30 may be inserted into and fixed to the socket fixing part 265. The inverter insertion hole 31 formed on the socket main body 30 is exposed to a lower part of the connection plate 260. The contact hole 35 formed on the socket main body 30 is exposed to an upper part of the connection plate 260. In other words, the connection plate 260 may include an upper surface and an opposing lower surface, and the contact hole 35 is available above the upper surface of the connection plate 260 and the inverter insertion hole 31 is available below the lower surface of the connection plate 260.

Further, the power-applying module may be in a form (not illustrated) in which a plurality of lamp sockets is formed in a body without using any separate connection plate. In other words, a socket main body may have a plurality of contact holes and a plurality of inverter insertion holes and may be integrally formed with a plate that spaces the contact holes at a distance and the insertion holes at a distance for receiving the lamps and inverters, respectively.

Backlight Assembly

Figure 6:
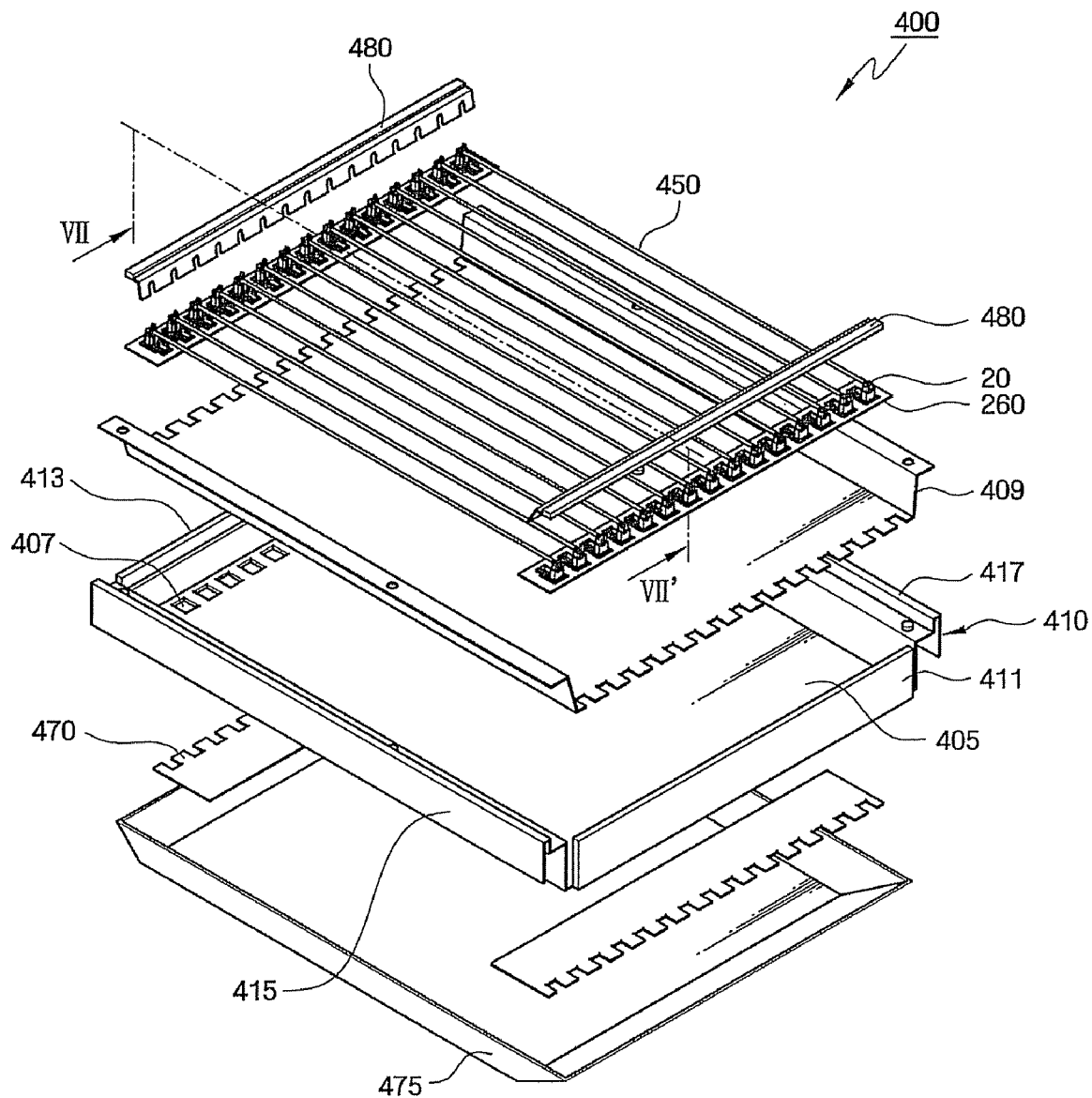
FIG. 6 is an exploded perspective view of an exemplary backlight assembly according to an exemplary embodiment of the present invention.
Figure 7:
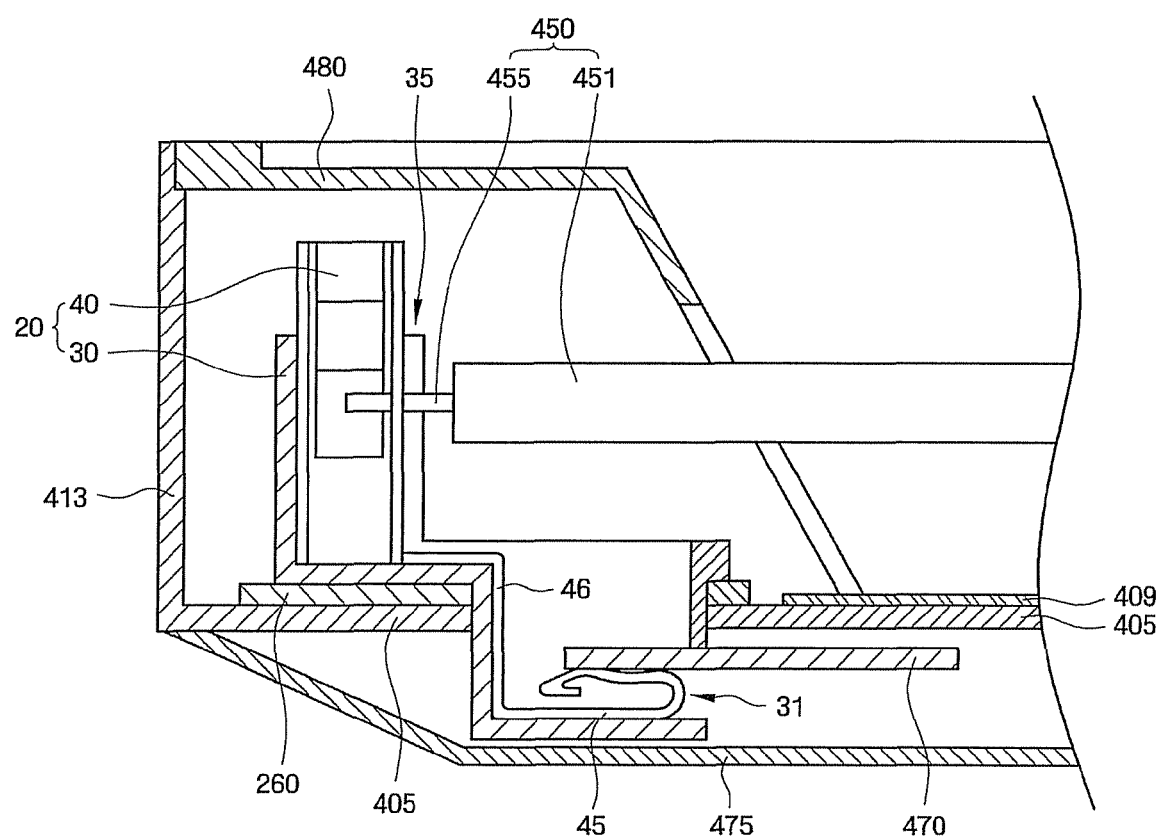
FIG. 7 is a sectional view of the exemplary backlight assembly taken along line VII-VII' of FIG. 6.

FIG. 6 is an exploded perspective view of an exemplary backlight assembly according to an exemplary embodiment of the present invention, and FIG. 7 is a sectional view of the exemplary backlight assembly taken along line VII-VII' of FIG. 6.

Referring to FIGS. 6 and 7, a backlight assembly 400 includes a receptacle 410, a plurality of lamp sockets 20, a plurality of lamps 450, and a power supply board 470.

The receptacle 410 includes a bottom plate 405, and first to fourth side walls 411, 413, 415, and 417 arranged around the bottom plate 405. The first and second side walls 411 and 413 are arranged on opposite sides of the receptacle 410 to face each other. The third and fourth side walls 415 and 417 are arranged on opposite sides of the receptacle 410 to face each other, and are connected to the first and second side walls 411 and 413, respectively. At upper ends of the first to fourth side walls 411, 413, 415, and 417, stepped portions are formed. On the bottom plate 405 neighboring the first and second side walls 411 and 413, a plurality of openings 407 is formed.

The lamp 450 includes a lamp main body 451 and an electrode part 455. The lamp main body 451 is in the form of a straight tube, and a discharge gas such as argon or mercury (Hg) is injected into the lamp main body 451. The electrode part 455 is arranged at an edge of the lamp main body 451. The electrode part 455 includes a discharge electrode and a lead wire. The discharge electrode is positioned inside the lamp main body 451, and the lead wire extends from the discharge electrode to an outside of the lamp main body 451. The lead wire of the electrode part 455 is inserted into the slot of the first guide groove 42 while pressure is placed by the lead wire on the plate spring 43, and then the lead wire enters the indentation of the first guide groove 42. The plate spring 43 presses the lead wire into place within the indentation, thus retaining the lamp 450 into position with respect to the lamp socket 20 and ensuring contact between the lead wire of the lamp 450 and the lamp connection terminal 44 of the power applying member 40. In another exemplary embodiment of the present invention, the lamp 450 may be an external electrode fluorescent lamp ("EEFL").

The lamp socket 20 is inserted into the opening of the socket fixing part 265 formed on the connection plate 260. The connection plate 260 is arranged near each of the first and second side walls 411 and 413. The plurality of lamp sockets 20, inserted into the connection plate 260, is respectively inserted into the plurality of openings 407 formed on the bottom plate 405. The connection plate 260 may then lie substantially flush with the bottom plate 405. In this case, the inverter insertion hole 31 is exposed to the rear surface of the bottom plate 405, and the contact hole 35 is exposed to an inside of the receptacle 410.

The backlight assembly 400 may further include a reflecting plate 409. The reflecting plate 409 is arranged on the bottom plate 405 of the receptacle 410, and reflects light emitted from the lamps 450 to an upper part of the backlight assembly 400.

The power supply board 470 is arranged on the rear surface of the bottom plate 405, and outputs a lamp driving voltage. The power supply board 470 may include a printed circuit board ("PCB") and a power supply element mounted on the PCB.

One edge of the power supply board 470 is inserted into the inverter insertion hole 31 of the lamp socket 20. One edge part of the power supply board 470 that corresponds to the inverter insertion hole 31 is projected toward the inverter insertion hole 31. As a result, the edge of the power supply board 470 is in the form of prominence and depression, wherein the prominence or projection is inserted in the inverter insertion hole 31. The inverter connection terminal 45 disposed within the inverter insertion hole 31 may include a spring like portion folded over to form an inverted C-shape such that when the projected part of the power supply board 470 is inserted into the inverter insertion hole 31, the projected part pushes onto the spring like portion of the inverter connection terminal 45 to ensure a connection with the inverter connection terminal 45.

At the projected part of the edge of the power supply board 470, a power supply terminal is formed. The power supply terminal, for example, may be an exposed part of the conductive wire formed on the PCB.

The backlight assembly 400 may further include a case 475 that protects the power supply board 470, and intercepts electromagnetic waves.

The backlight assembly 400 may further include a side cover 480. The side cover 480 covers and protects the lamp sockets 20 arranged on the first and second side walls 411 and 413 in the receptacle 410.

Through the application of the lamp sockets according to the exemplary embodiment of the present invention, wiring and soldering processes among the lamp sockets, the lamps, and the power-applying module can be omitted, and thus the assembling of the backlight assembly can be improved.

Display Device

Figure 8:
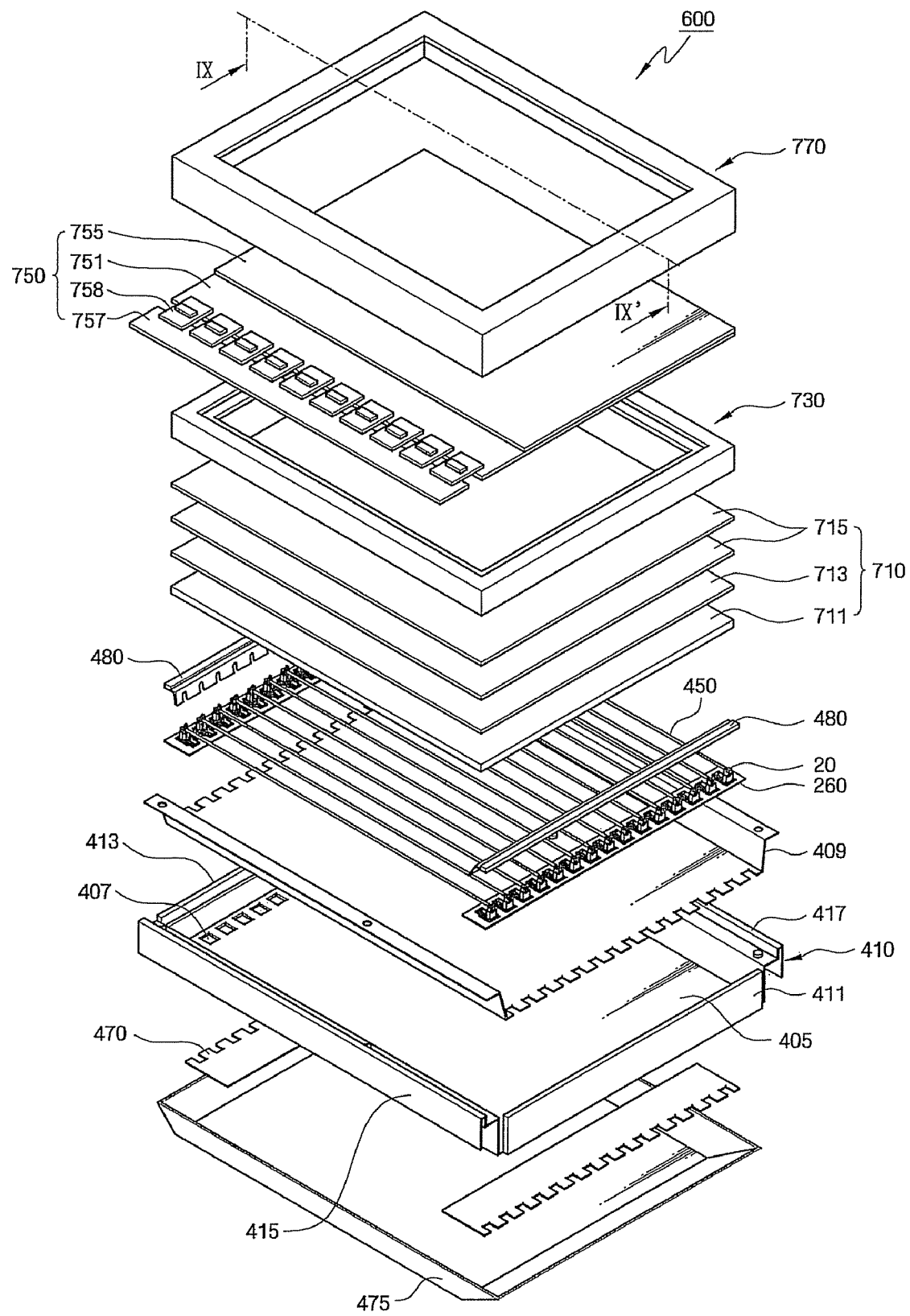
FIG. 8 is an exploded perspective view of an exemplary display device according to an exemplary embodiment of the present invention.
Figure 9:
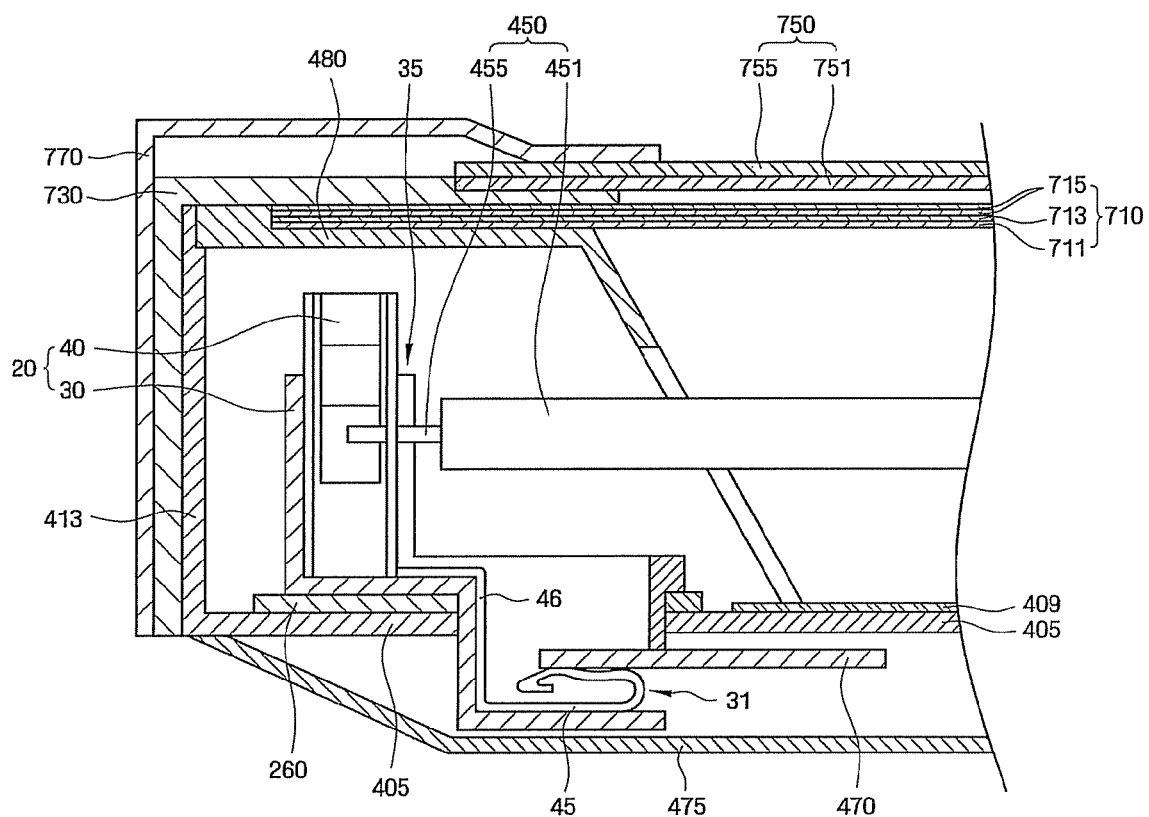
FIG. 9 is a sectional view of the exemplary display device taken along line IX-IX' of FIG. 8.

FIG. 8 is an exploded perspective view of an exemplary display device according to an exemplary embodiment of the present invention, and FIG. 9 is a sectional view of the exemplary display device taken along line IX-IX' of FIG. 8.

Referring to FIGS. 8 and 9, a display device 600 includes a receptacle 410, a plurality of lamp sockets 20, a plurality of lamps 450, a connection plate 260, a power supply board 470, a side cover 480, optical sheets 710, and a display panel 750.

The optical sheets 710 improve the optical characteristics of light emitted from the lamps 450 and emit the improved light. The optical sheets 710 may include a diffusion plate 711, a diffusion sheet 713, and condensing sheets 715 laminated in order. The diffusion plate 711, the diffusion sheet 713, and the condensing sheets 715 are supported by stepped portions formed on the third side wall 415, the fourth side wall 417, and the side cover 480.

The diffusion plate 711 diffuses the light emitted from the lamps 450 to improve the luminance uniformity. The diffusion sheet 713 converts the light randomly diffused by the diffusion plate 711 into the diffused light having a constant diffusion angle. The condensing sheets 715 condense the diffused light in different directions, and preferably in directions perpendicular to each other, so that the front luminance of the light emitted by the lamp 450 is improved.

The display device 600 may further include a middle frame 730. The middle frame 730 covers the edges of the optical sheets 710, and is coupled to the receptacle 410.

The display panel 750 displays an image based on the light emitted from the optical sheets 710. The display panel 750 includes a first substrate 751, a second substrate 755 facing the first substrate 751, and a liquid crystal layer interposed between the first substrate 751 and the second substrate 755.

The display device 600 may further include a PCB 757 and a connection film 758. The PCB 757 outputs a panel driving signal to the display panel 750. One end portion of the connection film 758 is electrically connected to the edge of the first substrate 751, and the other end portion of the connection film 758 is electrically connected to the PCB 757.

The display device 600 exposes an effective display region of the display panel 750, and may further include a top chassis 770 coupled to the receptacle 410 or the middle frame 730.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A lamp socket comprising:
   a socket main body comprising a contact hole formed therein; and
   a power-applying member coupled to the socket main body through the contact hole, and provided with a lamp connection terminal, an inverter connection terminal, and a terminal connection part connected with the lamp connection terminal in a bent form so as to connect the lamp connection terminal with the inverter connection terminal,
   wherein the lamp connection terminal includes a first plate having a first guide groove into which a lamp is inserted, and
   wherein the first guide groove includes an insertion into which a lamp is inserted and a fixing portion extending from the insertion portion to fix the lamp, and one side surface of the fixing portion protrudes laterally from one side surface of the insertion portion such that a width of the fixing portion is larger than a width of the insertion portion.

2. The lamp socket of claim 1, wherein the terminal connection part is composed of at least one horizontal portion and at least one vertical portion.

3. The lamp socket of claim 1, wherein the terminal connection part that is in a bent form is connected to the inverter connection terminal.

4. The lamp socket of claim 3, further comprising an inverter insertion hole formed in the socket main body and connected to the contact hole.

5. The lamp socket of claim 4, wherein the inverter insertion hole extends in a substantially perpendicular direction with respect to an extending direction of the contact hole.

6. The lamp socket of claim 4, wherein the lamp connection terminal, the terminal connection part, and the inverter connection terminal are integrally formed in a body.

7. The lamp socket of claim 6, wherein the power-applying member is composed of a conductive material.

8. The lamp socket of claim 7, wherein the lamp connection terminal comprises a plate spring arranged on one side of the first plate to pressingly fix the lamp inserted into the first guide groove.

9. A backlight assembly comprising:
   a receptacle comprising a bottom plate on which openings are formed and side walls arranged around the bottom plate;
   a plurality of lamps comprising lamp main bodies and electrode parts formed at edges of the lamp main bodies, respectively, and arranged on the bottom plate;
   a plurality of lamp sockets each comprising a socket main body comprising a contact hole formed therein and a power-applying member coupled to the socket main body through the contact hole, the power-applying member including a lamp connection terminal, an inverter connection terminal, and a terminal connection part connected with the lamp connection terminal in a bent form so as to connect the lamp connection terminal with the inverter connection terminal; and
   a power supply board arranged on a rear surface of the bottom plate and outputting a lamp driving voltage to the power-applying member,
   wherein the lamp connection terminal includes a first plate having a first guide groove into which a lamp is inserted, and
   wherein the first guide groove includes an insertion into which a lamp is inserted and a fixing portion extending from the insertion portion to fix the lamp, and one side surface of the fixing portion protrudes laterally from one side surface of the insertion portion such that a width of the fixing portion is larger than a width of the insertion portion.

10. The backlight assembly of claim 9, wherein the terminal connection part is composed of at least one horizontal portion and at least one vertical portion.

11. The backlight assembly of claim 9, wherein the terminal connection part that is in a bent form is connected to the inverter connection terminal.

12. The backlight assembly of claim 11, further comprising an inverter insertion hole formed in the socket main body and connected to the contact hole.

13. The backlight assembly of claim 12, wherein the lamp connection terminal, the terminal connection part, and the inverter connection terminal are integrally formed in a body.

14. The backlight assembly of claim 13, wherein the power-applying member is composed of a conductive material.

15. The backlight assembly of claim 14, wherein the lamp connection terminal comprises a plate spring arranged on one side of the first plate to pressingly fix the lamp inserted into the first guide groove.

16. The backlight assembly of claim 9, wherein the power supply board includes projections inserted into an inverter insertion hole in the socket main body of each lamp socket, the projection contacting the inverter connection terminal exposed through the inverter insertion hole in each lamp socket.

17. The backlight assembly of claim 9, wherein the lamp sockets are partially inserted into the openings formed in the bottom plate, such that the lamp connection terminal of each lamp socket is disposed above an upper surface of the bottom plate and the inverter connection terminal is disposed below the rear surface of the bottom plate.

18. The backlight assembly of claim 9, further comprising a connection plate, the lamp sockets connected to the connection plate and spaced apart from each other to correspond to the openings in the bottom plate, the connection plate disposed on the bottom plate.

19. A display device comprising:
   a receptacle comprising a bottom plate on which openings are formed and side walls;
   a plurality of lamps comprising lamp main bodies and electrode parts formed at edges of the lamp main bodies, respectively, and arranged on the bottom plate;
   a plurality of lamp sockets each comprising a socket main body comprising a contact hole formed therein and a power-applying member coupled to the socket main body through the contact hole, the power-applying member including a lamp connection terminal, an inverter connection terminal, and a terminal connection part connected with the lamp connection terminal in a bent form so as to connect the lamp connection terminal with the inverter connection terminal;
   a power supply board comprising one side edge inserted into an inverter insertion hole and applying a lamp-driving voltage to the inverter connection terminal;
   a side cover covering the socket main bodies;
   optical sheets supported by the side cover; and
   a display panel arranged on the optical sheets,
   wherein the lamp connection terminal includes a first plate having a first guide groove into which a lamp is inserted, and wherein the first guide groove includes an insertion into which a lamp is inserted and a fixing portion extending from the insertion portion to fix the lamp, and one side surface of the fixing portion protrudes laterally from one side surface of the insertion portion such that a width of the fixing portion is larger than a width of the insertion portion.

20. The display device of claim 19, wherein the terminal connection part is composed of at least one horizontal portion and at least one vertical portion.

21. The display device of claim 19, further comprising an inverter insertion hole formed in the socket main body and connected to the contact hole;

wherein the lamp connection terminal, the terminal connection part, and the inverter connection terminal are integrally formed in a body.

* * * * *